Aug. 10, 1965   G. KIPER   3,199,428
CAMERA SHUTTER
Filed May 11, 1962   3 Sheets-Sheet 1

INVENTOR.
GERD KIPER
BY
Michael S. Striker
ATTY

Aug. 10, 1965  G. KIPER  3,199,428
CAMERA SHUTTER

Filed May 11, 1962  3 Sheets-Sheet 3

INVENTOR.
GERD KIPER
BY
Michael S. Striker
Atty

United States Patent Office 3,199,428
Patented Aug. 10, 1965

3,199,428
CAMERA SHUTTER
Gerd Kiper, Unterhaching, near Munich, Germany, assignor to Agfa Aktiengesellschaft, Leverkusen-Bayerwerk, Germany
Filed May 11, 1962, Ser. No. 194,118
Claims priority, application Germany, May 16, 1961, A 37,446
12 Claims. (Cl. 95—62)

The present invention relates to cameras.

More particularly, the present invention relates to camera shutters as well as to camera shutters which are capable of performing the function of a diaphragm.

It is known to provide camera shutters composed of only a pair of shutter blades capable of being moved between closed and open positions. Shutters of this type, however, suffer from the disadvantage of providing a non-symmetrical opening through which the exposure is made, so that particularly with short exposure times there is an undesirable one-sided vignetting. Moreover, with shutters of this type the masses involved not only in the shutter blades themselves but also in the structure for moving the shutter blades is undesirably large so that considerable dynamic forces come into play during operation of the shutter leading to improper operation and sometimes failure of the shutter. While there are known between-the-lens shutters composed of a number of relatively light shutter blades which are distributed about the optical axis, the blades of this type are required to be operated by shutter rings which must be very precisely manufactured in view of the precision with which they must be fitted with the rest of the assembly and the precision with which they must cooperate with the rest of the assembly, and as a result it is not possible to manufacture such shutters at a low price under mass production methods.

It is also known to provide cameras with shutters which can also operate as diaphragms. Of course, this is done so as to attempt to reduce the cost of the camera by avoiding the necessity of including in the camera a separate diaphragm assembly, as is conventional. However, in most cases the cost required to control a shutter so that it will also operate as a diaphragm makes any possible savings resulting from elimination of a separate diaphragm highly questionable. Also, in some cases where the shutter also performs the function of a diaphragm, it is only possible to provide one set of combinations of exposure times and diaphragms, with a predetermined combination of exposure time and exposure aperture provided for a given lighting condition, so that it is not possible with such a camera to provide a wide variation of combinations of exposure time and exposure aperture for a given set of lighting conditions. As is well known to those skilled in the art, it is possible to represent the operation of any shutter graphically, and the ideal type of shutter operation has a graphical representation of trapezoidal configuration. With known constructions where a shutter also operates as a diaphragm, the ideal operation of the shutter providing a trapezoidal operating diaphragm must be sacrificed.

It is accordingly a primary object of the present invention to provide a shutter composed of a pair of blades capable of being moved between their open and closed positions by a structure according to the present invention which together with the blades provides a relatively light assembly so as to avoid undesired accelerations of relatively large masses and which at the same time avoids the necessity of providing elements such as shutter rings which must be manufactured with great precision so as to undesirably increase the cost of the camera.

An equally important object of the present invention is to provide a shutter which can also operate as a diaphragm and which requires so little structure in addition to the shutter structure itself that the added cost as compared to a conventional shutter is but a fraction of the cost which would be required for a separate diaphragm assembly, so that the economic saving resulting from using the shutter of the invention which can also operate as a diaphragm is clearly apparent.

A further object of the present invention is to provide a shutter which will have its blades at all times positioned symmetrically with respect to the optical axis so that undesirable vignetting of the type referred to above is reliably avoided.

Also, it is an object of the present invention to provide a shutter which can also function as a diaphragm and which will still retain the trapezoidal diagram of operation.

It is furthermore an object of the present invention to provide a shutter which can operate as a diaphragm and which nevertheless provides a wide range of combinations of exposure time and exposure aperture for any given set of lighting conditions.

Still another object of the present invention is to provide a shutter which can operate as a diaphragm and which is capable of providing exposure times and exposure apertures which can be set either manually or automatically.

The objects of the present invention also include the provision of a shutter which can operate as a diaphragm and which can provide diaphragm settings either between predetermined increments or in a stepless manner so that in the latter case the diaphragm can be very precisely set.

Another object of the present invention is to provide a shutter of the above type which is capable of providing extremely short exposure times.

The objects of the present invention also include the provision of structure capable of accomplishing all of the above objects and at the same time composed of simple, rugged, inexpensive elements which are very reliable in operation and which will have a long life of trouble-free use.

With the above objects in view, the invention includes, in a camera shutter, a pair of linkages each of which is composed of a plurality of levers and a plurality of links extending between and pivotally connected to the levers. The blades of the shutter of the invention are made up of only two shutter blades operatively connected to the links of the above pair of linkage means, and a pair of linkage means of the invention cooperate with the two shutter blades to move the latter between their closed and open positions during movement of the pair of linkage means one relative to the other.

Also, in accordance with the present invention, there is provided, in a camera shutter, a pair of frame means, corresponding to the above-mentioned pair of linkage means, and movable between rest and cocked positions. The blades of the shutter are operatively connected to this pair of linkage means to be moved between closed and open positions when the pair of linkage means move one relative to the other. A means is provided for releasing first one frame means for movement from its cocked toward its rest position, resulting in movement of the shutter blades from their closed to their open position, and then, after a given exposure time, the other frame means from its cocked toward its rest position, so that when the latter frame means reaches its rest position the shutter blades will be closed. In accordance with the present invention, an adjustable means is carried by one of the frame means and engages the other of the frame means when the first frame means is released for movement in advance of the second frame means, so as to limit the extent to which the shutter blades are moved from their closed toward their open position, and in this way provide a predetermined exposure aperture.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
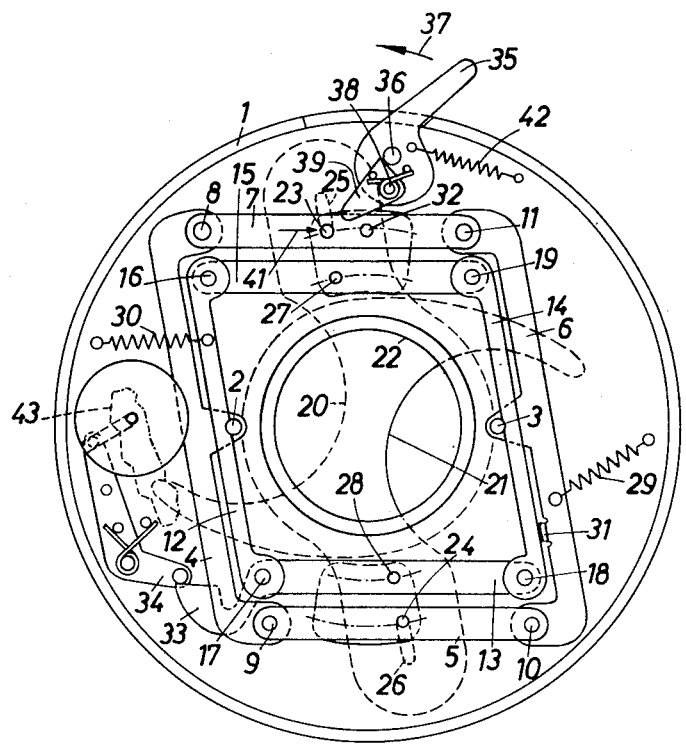
FIG. 1 illustrates the structure of a shutter according to the present invention.

Referring now to FIG. 1, there is shown therein a shutter housing 1 in which are located a pair of linkage means. One of these linkage means is formed by the elements 4-11, while the other of the linkage means is formed by the elements 12-19. The linkage means 4-11 includes an elongated lever 4 which is pivotally supported intermediate its ends by a stationary pivot pin 2 carried by a stationary part of the assembly, and the linkage means 4-11 includes a second elongated lever 6 which is parallel to the lever 4 and which is also supported intermediate its ends for turning movement, the lever 6 being pivotally supported by a stationary pivot pin 3 which is carried by a suitable stationary structure of the camera. The pivot pin 2 is midway between the ends of the lever 4, and the pivot pin 3 is midway between the ends of the lever 6. The linkage means 4-11 further includes an elongated link 7 extending between and pivotally connected to the levers 4 and 6 at the pivot point 4 and 11, and the linkage means 4-11 is completed by an elongated link 5 which extends between and is pivotally connected to the levers 4 and 6 at the points 9 and 10. It is apparent that with this linkage means the levers 4 and 6 will at all times be parallel to each other and the links 5 and 7 will also remain parallel to each other at all times. In fact, considering the pivots 2 and 3 and the stationary structure which carries the same as a stationary link, it will be seen that on one side of a straight line drawn through the axes of the pivots 2 and 3 there is provided a parallelogram linkage, for example by the portions of the levers 4 and 6 which are on the same side of this straight line as the link 5, and including the link 5, while a corresponding parallelogram linkage including the link 7 is of course formed on the other side of this straight line, so that with this construction, if the stationary structure carrying the pivots 2 and 3 is considered as one stationary link, the entire linkage means is made up of five elements, namely, this one stationary link as well as the two movable links 5 and 7 and the pair of levers 4 and 6, and of course this linkage means provides a pair of parallelogram linkages interconnected with each other for movement at all times in equal and opposite directions, as is apparent from FIG. 1. The linkage means 12-19 is constructed in the same way although it is of a smaller size than the linkage means 4-11, and of course the linkage means 12-19 is located in a plane which is nearer to the viewer of FIG. 1 than the linkage means 4-11, so that the pair of linkage means can move one relative to the other into overlapping relationships without one linkage means interfering in any way with the other linkage means. Thus, it will be seen that the linkage means 12-19 includes the levers 12 and 14 which are also pivotally supported midway between their ends by the pivots 2 and 3, and this linkage means 12-19 includes the pair of links 13 and 15, the link 13 being pivotally connected to ends of the levers 12 and 14 at the points 17 and 18, while the link 15 is pivotally connected to the levers 12 and 14 at the points 16 and 19.

The pair of shutter blades 20 and 21 of the shutter of FIG. 1 are arranged symmetrically with respect to the optical axis which passes through the center of the shutter opening 22 through which the exposure is made. The shutter blade 21 is pivotally connected to the link 13 by a pivot pin 28, and a pin 24 which is fixed to the link 5 passes through an elongated slot 26 formed in the shutter blade 21. In the same way, the shutter blade 20 is pivotally connected to the link 15 by a pivot pin 27, and a pin 23 which is fixedly carried by the link 7 extends through an elongated slot 25 which is formed in the shutter blade 20.

The linkage or frame means 4-11 is yieldably maintained in the rest position thereof illustrated in FIG. 1 by a spring 29, this spring 29 being connected at one end to the lever 6 and at its opposite end to a stationary part of the assembly, and any suitable stop member is engaged by the linkage means 4-11 so that the spring 29 cannot move it beyond the illustrated rest position thereof shown in FIG. 1, although, of course, the linkage means can move in a direction which will tension the spring 29. The lever 6 carries a projection 31, and a spring 30 is connected at one end to the lever 12 and its opposite end to a stationary part of the assembly for urging the linkage or frame means 12-19 to the illustrated position where the lever 14 thereof engages the stop member 31 formed by the projection of the lever 6, so that in this way the rest position of the linkage means 12-19 is determined. A stop member similar to the member 31 and engaging the outer or right edge of the lever 6 may be provided for retaining the linkage means 4-11 in its rest position, or this stop means may simply be formed by the inner surface of the tubular outer wall of the shutter housing 1, if desired. The link 7 of the linkage means 4-11 carries a pin 32 for a purpose described below, and the link 13 of the linkage means 12-19 has an extension 33 which cooperates with a lever 34 of a timing mechanism which controls the exposure time.

The shutter assembly includes a stationary pivot pin 36 on which a manually operable lever 35 is turnably mounted, this lever having a portion extending to the exterior of the shutter housing through a slot in the outer tubular wall thereof, and when the shutter is to be actuated the operator will turn the lever 35 in the direction of the arrow 37 shown in FIG. 1. The lever 35 carries a pivot pin 38 on which a swing member 39 is turnably mounted, and a spring which is coiled about the pin 38 and engages a pair of pins respectively carried by the member 39 and a lever 35 urge the member 39 to turn into engagement with the pin 36, as shown in FIG. 1.

When the operator turns the lever 35 in the direction of the arrow 37, the swing member 39 will engage the pin 32 so that the entire linkage means 4-11 will be moved in opposition to the spring 29, the link 7 moving at this time in the direction indicated by the arrow 41. Of course, the projection 31 of the lever 6 engages the lever 14 so that the linkage means 12-19 is compelled to move with the linkage means 4-11, and of course the spring 30 is tensioned simultaneously with the spring 29. It will be noted that the parts are so arranged that the pins 23, 27, 28 and 24 all turn along circles which are concentric and which have their common center in the optical axis, so that while both of the shutter blades 20 and 21 turn at this time about the optical axis, they do not move relative to each other and do not uncover the exposure aperture 22.

The operator continues to turn the lever 35 until the outer tip of the swing member 39 rides off the pin 32, and at this moment the shutter is released to run down and make the exposure. However, before the tip of the swing member 39 rides off the pin 32, the pin which is shown at the lower right of lever 34 in FIG. 1 will have moved behind the left free end portion of the extension 33 of the link 13, as viewed in FIG. 1, and furthermore, the turning of the lever 34 by the illustrated spring cooperating therewith to the position where the pin at the lower right end of the lever 34 is behind the extension 33 is limited by engagement of another pin of the lever 34 with an exposure-time determining member 43 of known construction which has previously been set at a selected exposure time, so that in this way the pin which is carried by the lever 34 and cooperates with the exposure-time setting means 43 can only move through a certain distance into engagement with the selected step of the exposure-time determining element 43, and thus the angular position of the lever 34 at this time is determined in accordance with the selected exposure time.

It will be noted that when the tip of the swing member 39 rides off and beyond the pin 32 the spring 30 will try to return the linkage means 12–19 to its illustrated rest position, from the cocked position which it takes at the instant when the tip of the member 39 engages the pin 32, but this movement of the linkage means 12–19 by the spring 30 is retarded because it is necessary for the extension 33 to turn the lever 34 back to the illustrated position, and this return of the lever 34 back to its illustrated position is resisted not only by the spring which cooperates with the lever 34 but also by a rotary mass of a predetermined size which has a pin-and-slot connection with the lever 34 so that this rotary mass retards the return of the linkage means 12–19 to its rest position by the spring 30 in accordance with the preselected exposure time. The exposure-time determining structure per se is well known and forms no part of the present invention.

While the return of the linkage means 12–19 to its rest position is retarded in the above-described manner, in accordance with the preselected exposure time, the return of the linkage means 4–11 to its rest position is not retarded. Thus, as soon as the tip of the member 39 rides off the pin 32, the spring 29 will return the linkage 4–11 to its illustrated position, while the linkage 12–19 will remain in its cocked position until the predetermined exposure time has elapsed, and in this way the linkage 4–11 moves relative to the linkage 12–19 so that the pins 23 and 24 turn relative to the pins 27 and 28 and thus the shutter blades 20 and 21 are swung to their open position uncovering the opening 22. The return of the linkage means 12–19 to its rest position will of course return the parts to the illustrated position where the shutter blades again assume their position closing the opening 22.

Of course, the linkage or frame means 4–11 will have returned to its rest position before the operator releases the lever 35, and when the operator releases the lever 35 the spring 42 returns it to the illustrated rest position thereof, and during this return movement of the lever 35 the spring wound around the pin 38 which yieldably maintains the member 39 in engagement with the pin 36 can yield to allow the member 39 to pass the pin 32 without disturbing the rest position of the linkage 4–11.

It will be noted that when the member 39 rides off the pin 32 the linkage means 4–11 is released for free movement all the way back to its rest position so that the opening 22 is completely uncovered before the linkage means 12–19 returns to its rest position in order to close the shutter. Where a complete uncovering of the opening 22 is not essential, it is possible to provide even shorter exposure times.

Of course, drives other than that described above for releasing first the linkage or frame means 4–11 in order to open the shutter and then the linkage or frame means 12–19 in order to close the shutter may be provided. Although the above-described structure of FIG. 1 is preferred, it is also conceivable to use the invention with only one linkage means, namely the linkage means 4–11, while providing stationary pivot pins 27 and 28 carried by stationary parts of the assembly, and in this case, of course, the linkage means 12–19 would be omitted. With this type of construction it is necessary that the single linkage means move, during the running down of the shutter, first in one direction and then in the other direction, the blades being open by movement in the one direction and closed by movement in the other direction, and such a single linkage means can be actuated by shutter driving mechanisms known for between-the-lens shutters which include only one shutter ring which oscillates back and forth in order to open and close the shutter. Such driving mechanisms include known crank slide assemblies. However, it will be noted that with this construction it is necessary during the running down of the shutter to reverse the direction of movement of the linkage means, and this disadvantage is avoided with the structure shown in FIG. 1, so that this latter structure is preferred.

Moreover, it is possible to place the timing mechanism, which controls the exposure time, in the position where it cooperates, not with the linkage means 12–19, but with part of the guiding structure, and it is also possible in a known way to provide a self-timer which will delay the running down of the shutter for a given period of time, as well as with a flash-contact assembly to provide flash exposures. Moreover, it is apparent that the structure of FIG. 1 is particularly suited for use with a structure for automatically determining the exposure in a camera which automatically sets the exposure time and/or the diaphragm.

Figure 2:
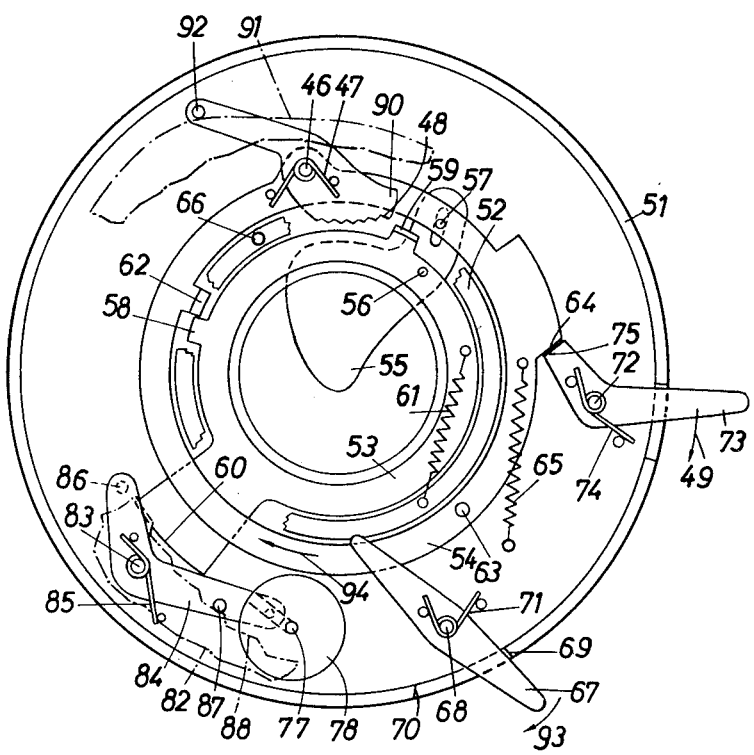
FIG. 2 illustrates the structure of a shutter, according to the present invention, which can also function as a diaphragm.

Referring now to FIG. 2, it will be seen that the shutter housing 51 illustrated therein has a central tube 52 surrounded by the shutter ring 54 and surrounding the shutter ring 53, the tube 52 being provided with suitable slots so that, where necessary, portions of the rings 53 and 54 and parts which cooperate therewith can pass through the slots of the tube 52. A plurality of shutter blades 55 are operatively connected to the rings 53 and 54, and for the sake of clarity only one shutter blade 55 is shown. A pivot pin 56 pivotally connects each shutter blade 55 to the shutter ring 53, and the several blades 55 are formed with elongated slots respectively receiving the pins 57 which are fixed to the ring 54. The shutter ring 53 has a projection 58 as well as additional radially extending projections 59 and 60. A drive spring 61 is connected at one end to the ring 53 and at its opposite end to the tube 52 for urging the ring 53 to turn in a clockwise direction, as viewed in FIG. 2, to a rest position described below. The shutter ring 54 has an inwardly directed radial projection 62 as well as a pin 63 and an outer projection 64. A spring 65 is connected at one end to the ring 54 and at its opposite end to a stationary part of the shutter housing for urging the ring 54 to turn in a clockwise direction, as viewed in FIG. 2, to a rest position where the projection 62 engages the stationary pin 66 carried by the tube 52. In the rest position of the ring 53, its projection 58 engages the pin 66, so that in this way the rest position of both shutter rings is determined.

The pin 63 of the ring 54 is adapted to be acted upon by a shutter-cocking lever 67 which is pivotally supported by a stationary pin 68 of the shutter housing and which extends through a slot of the outer wall of the shutter housing 51 to the exterior thereof so that the lever 67 is accessible to the operator to be turned in the direction of the arrow 93 when the shutter is cocked. The slot through which the lever 67 extends has ends 69 and 70 which limit the turning of the lever 67, and a spring 71 is coiled around the pin 68 and engages pins respectively carried by the lever 67 and the shutter housing so as to urge the lever 67 to the illustrated rest position thereof where it engages the end 69 of the slot.

The shutter housing also carries a shutter-release lever 73 which is turnable about a stationary pin 72 and which can be turned by the operator in the direction of the arrow 49 in order to release the shutter, a spring 74 cooperating with the lever 73 to urge it to the illustrated rest position. The free end 75 of the lever 73 acts as a pawl and cooperates with the lower end of the projection 64 of ring 54, as viewed in FIG. 2, to retain the rings in their illustrated cocked positions. Thus, in order to cock the shutter the operator will turn the lever 67 in the direction of the arrow 93, and the lever 67 will engage the pin 63 to displace the ring 54 to the position illustrated in FIG. 2 where the release lever 73 has snapped behind the projection 64. Of course, at this time the ring 54 turns in opposition to the spring 65 in a counterclockwise direction, as viewed in FIG. 2, and the projection 62 of the ring 54 by engagement with the projection 58 of the ring 53 will turn the latter together with the ring 54, so that the spring 61 also becomes tensioned, and since during this cocking of the shutter there is no relative movement between the rings 53 and 54 the shutter blades simply move around the optical axis together with the shutter rings and the shutter remains closed.

The projection 60 of the shutter ring 53 cooperates with the timing mechanism which determines the exposure time. This timing or retarding mechanism is similar to that shown in FIG. 1 and described above. It includes the lever 84 turnably carried by the stationary pin 83 and urged by the spring 85 in a clockwise direction, as viewed in FIG. 2. The lever 84 carries a pin 87 which cooperates with the adjustable exposure-time determining cam 88, while the pin 86 cooperates with the projection 60. Thus, when the operator turns the timing ring 82 during setting of the exposure time in a well known manner, a predetermined step of the cam 88 will be engaged by the pin 87 so as to determine the angular position of the lever 84. The lever 84 has a pin-and-slot connection with the rotary mass 78 turnably carried by the stationary pin 77, and the rotary mass 78 retards the turning of the lever 84 when the projection 60 presses against the pin 86, so that the exposure time is determined in this manner which is well known in the art and does not form part of the present invention.

The exposure time adjusting ring 82 may have an edge portion which engages the diaphragm adjusting cam 91 which is engaged by a pin 92 of an exposure-aperture controlling lever 90, so that with such an arrangement the position of the cam 91 will change with a change in the position of the exposure-time determining member 82, and thus with such an arrangement for every exposure time there will be a given exposure aperture. It will be noted that when the shutter is cocked the projection 60 moves past the pin 86 so that this pin can move behind the projection 60, as shown in FIG. 2, thus permitting the spring 85 to move the pin 87 into engagement with the cam 88. It is also possible to adjust the exposure time by turning the ring 82 after the shutter has been cocked.

The exposure-aperture determining lever 90 is pivotally carried by a pin 46 which is carried by the ring 54, and, as will be apparent from the description below, this lever 90 forms an adjustable means, adjusted by the cam 91, for adjusting the exposure aperture so as to enable the blades 55 to perform the function of a diaphragm. A spring 47 acts on the lever 90 to turn the latter in a counterclockwise direction, as viewed in FIG. 2, so as to maintain the pin 92 of the lever 90 in engagement with the camming edge 91. The lever 90 has a stepped edge portion 48 of predetermined curvature which will determine the exposure aperture. Instead of providing transmission of the turning of the ring 82 to the cam 91, it is also possible to manually adjust the cam 93 in the same way as a conventional diaphragm ring is adjusted, so that in this way it is possible to provide exposure apertures independently of the particular exposure time.

Assuming now that the shutter has been cocked and therefore the position shown in FIG. 2, the exposure will be made when the operator turns the lever 73 in the direction of the arrow 49 so as to release the shutter ring 54 to the spring 65. Of course, the ring 53 will also be released to the spring 61, but while the ring 54 is free to be turned by the spring 65 from the illustrated cocked position to its rest position, the ring 53 is not free to turn immediately back to its rest position under the action of the spring 61 since the pin 86 engages the projection 60 and therefore the return of the ring 53 from its illustrated cocked position to its rest position by the spring 61 is retarded temporarily for a period of time equal to the preselected exposure time. Thus, the ring 54 turns in advance of the ring 53 and the shutter blades 55 move from their closed position to an open position providing an aperture through which film in the camera will be exposed.

The lever 90 will of course turn together with the ring 54, and the lever 90 will prevent the ring 54 from returning all the way to its rest position. A portion 59 of the ring 53, in the form of a projection of the ring 53, is in the path of movement of the edge 48, and this edge 48 is set by cooperation of the pin 92 with the camming edge 91 so that a predetermined step of the edge 48 will engage the projection 59 to limit the extent to which the blades 55 move toward their fully open position, and in this way the blades 55 will provide an exposure aperture enabling the blades 55 to act also as a diaphragm. Thus, when a step of the edge 48 of the lever 49 engages the projection 59 the blades will have provided an opening in accordance with the angular position of the cam 91, so that this opening is the same as an opening which would be provided by a conventional diaphragm. Now the rings 53 and 54 turn together and in accordance with the setting of the exposure time the turning of both rings together may be retarded until the preselected exposure time is provided. As soon as the projection 60, under the action of the spring 61, turns the lever 84, by acting on the pin 86 thereof, to an angular position permitting the projection 60 to move past the pin 86, the springs 61 and 65 will turn the rings 53 and 54 together toward their rest positions, so that until the projection 62 of the ring 54 engages the pin 66 the predetermined exposure aperture will be maintained. When the projection 62 engages the pin 66 the ring 54 of course stops turning, and then the ring 53 will continue to turn until its projection 58 engages the projection 62, and of course the projection 59 will move away from the lever 90. Thus, during this latter part of the operation the shutter will be closed. The exposure time graduations may be used for setting the ring 82 have values which take into account the fact that the shutter remains open during turning of the rings together after the projection 60 is released for movement past the pin 86 until the projection 62 engages the pin 66.

The fact that the rings 53 and 54 turn together after being released by the retarding mechanism so as to maintain the exposure aperture unchanged until the projection 62 engages the pin 66 is of very great significance since in this way it is possible to provide a shutter operating diagram of trapezoidal configuration without the use of a separate diagram while using only the shutter blades to provide the exposure aperture. This trapezoidal diagram will have a roof or upper line of lesser or greater width depending upon the selected exposure time so as to provide in this way preselected exposure times. Since it is possible with the lever 90 to adjust the extent to which the blades 55 will move away from their closed positions, it is possible to adjust the exposure time independently of the selected exposure aperture. However, by providing a suitable coupling between the ring 82 and the cam 91 it is also possible to provide a predetermined interrelation between the exposure time and exposure aperture, for example, exposure apertures which increase in size as the exposure times increase. Thus, it is possible with the structure of FIG. 2 to provide all of the operations which can be obtained with conventional shutters and diaphragms, although a separate diaphragm assembly is not required and in addition to a normal shutter assembly it is only necessary to provide the lever 90. Thus, the shutter of the invention provides a highly significant saving in structure as compared to known shutters which through extremely complicated mechanisms can also function as diaphragms. It should be noted that the shutter of FIG. 2 can also be cocked and released as by shortening the inner end of the lever 67 so that its inner tip will ride off the pin 63, and thus in this case the shutter will be cocked and released in a manner similar to the shutter of FIG. 1, and also it is possible to cock the shutter automatically as is well known by a structure actuated each time the film is advanced.

It is apparent that with the structure of FIG. 2 the rings 53 and 54 form a pair of frame means cooperating with the shutter blades 55 in the manner described above.

Figure 3:
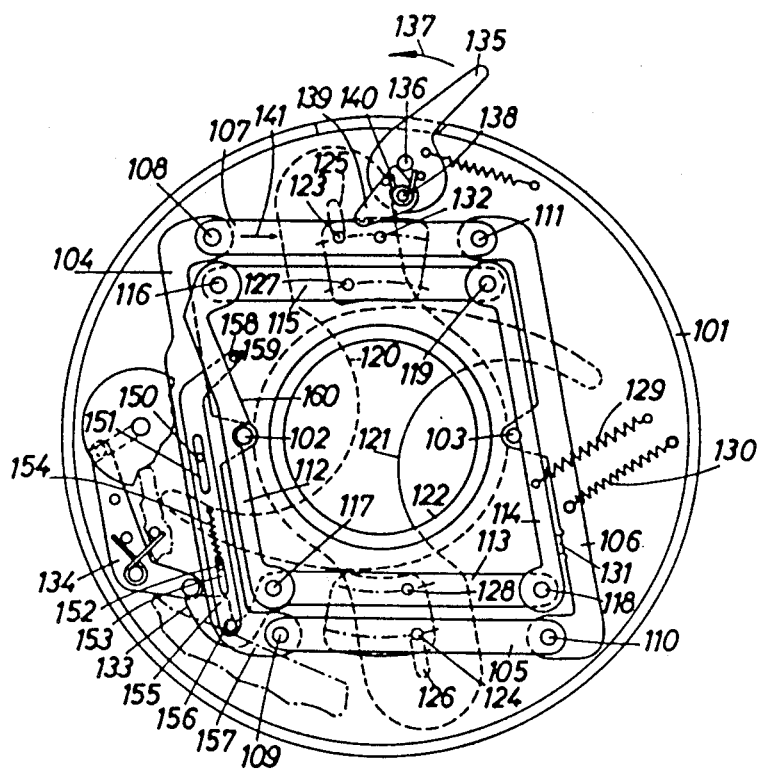
FIG. 3 illustrates a structures where the shutter of FIG. 1 has combined with it additional structure which with minor variations in the structure of FIG. 1 enable the shutter of FIG. 1 to act also as a diaphragm.

Referring to FIG. 3, it will be seen that the shutter structure illustrated therein is substantially identical with that of FIG. 1. However, the shutter structure of FIG. 3 has applied to it the principles described above in connection with FIG. 2, so that the shutter of FIG. 3 can also act as a diaphragm. Referring to FIG. 3, it will be seen that the shutter housing 101 carries in its interior a frame or linkage means 104–111 substantially identical with the linkage means 4–11 described above as well as a second linkage means 112–119 substantially identical with the linkage means 12–19 described above, the pins 102 and 103 of FIG. 3 acting as pivots in the same way as the pins 2 and 3. The shutter blades 120 and 121 are identical with the blades 20 and 21 of FIG. 1 and are connected in the same way by pivot pins 127 and 128 to the links 115 and 113, respectively, and the shutter blades respectively have slots 125 and 126 which receive the pins 123 and 124 fixed to the links 107 and 105, so that the shutter of FIG. 3 will operate in the same way as the shutter of FIG. 1. The spring 130 acts on the frame means 104–111 in the same way as the spring 29 of FIG. 1, whereas the spring 129 produces the same results as the spring 30 of FIG. 1 although the spring 129 is connected to the link 114. The projection 131 of the lever 106 engages the lever 114 so as to limit the turning of the frame or linkage means 112–119 by the spring 129. The link 113 of the linkage means 112–119 has an extension 133 which cooperates with the lever 134 of the timing mechanism in the manner described above in connection with FIG. 1.

The shutter of FIG. 3 is actuated by a structure identical with that of FIG. 1, and this structure includes the lever 135 turnably carried by the pin 136 and carrying the swing member 139 by way of a pivot pin 138, the spring 140 urging the member 139 into engagement with a pivot pin 136, in the same way that the spring which cooperates with the swing member 39 urges the latter into engagement with the pivot pin 36. Thus, in order to actuate the shutter of FIG. 3 the operator will turn the lever 135 in the direction of the arrow 137, and the swing member 139 will engage the pin 132 which is fixed to the link 107 so as to displace the latter in the direction of the arrow 141, and thus both of the linkage or frame means of FIG. 3 will be moved in opposition to the springs which act thereon in the same way as the pair of linkage or frame means of FIG. 1. The pair of linkages will continue to move in opposition to the springs 129 and 130 until the tip of the member 139 rides off the pin 132, and then the linkage means 104–111 will be released to the spring 130 while the release of the linkage means 112–119 will be retarded by cooperation of the extension 133 with the exposure-time determining structure.

In order that the shutter of FIG. 3 will also operate as a diaphragm, the frame or linkage means 104–111 carries an adjustable means corresponding to the adjustable means formed by the lever 90 of FIG. 2, but in the case of FIG. 3 the adjustable means takes the form of an elongated slide member 155 which is slidably carried by the lever 104 for longitudinal movement therealong. The lever 104 fixedly carries a pair of pins 150 and 152 which are respectively received in slots 151 and 153 formed in the slide member 155, so that in this way the slide member 155 is guided for movement longitudinally of the lever 104 while being constrained to turn therewith, and a spring 154 is connected at one end to the slide member 155 and at its opposite end to the pin 152 so as to urge the slide member 155 downwardly, as viewed in FIG. 3, and a pin 156 which is carried by the slide member 155 is maintained in this way in engagement with the camming edge 157 of an adjustable element such as a ring which forms an adjusting means for controlling the exposure aperture. The position of cam 157 may be set either manually or by an automatic structure which automatically responds to the lighting conditions in a manner well known in the art, and in this way the position of the slide member 155 longitudinally of the lever 104 can be determined.

The slide member or adjustable means 155 has an extension 158 extending between the levers 104 and 112, and the upper portion of the lever 112, as viewed in FIG. 3, has a suitably curved edge 160, which cooperates with the pin 159 carried by the extension 158 so as to determine the size of the exposure aperture.

Thus, with this arrangement when the frame means 104–111 is released for return movement by the spring 130 from its cocked position back toward its rest position, this return movement will take place only until the pin 159 engages the edge 160 of the linkage or frame means 112–119 which is retarded in its return movement by the retarding mechanism, and thus in this case also the extent to which the blades 120 and 121 can be turned toward their fully open position is limited so as to provide an exposure aperture in accordance with the position of the camming edge 157. Thus, when the pin 159 engages the edges 160, the linkage means 104–111 can return toward its rest position only together with the linkage means 112–119. During the period when the return of the linkage means 112–119 to its rest position is retarded by the retarding mechanism the exposure aperture will of course be maintained, and also upon release of the linkage means 112–119 for return to its starting position by the spring 129, the pair of linkage means will move together while maintaining the exposure aperture unchanged until the linkage means 104–111 reaches its rest position, and immediately thereafter the spring 129 will return the linkage means 112–119 to its rest position, so that the shutter blades will be returned to their closed position and of course the pin 159 will move away from the edge 160 so that the parts will again have the position shown in FIG. 3 where the lever 114 engages the projection 131 of the lever 106.

It is possible with the embodiment of FIG. 3 to provide exposure aperture adjustments dependent upon or independent of the exposure time setting while using only one pair of shutter blades which act also as a diaphragm, and it will be noted that with this construction in addition to the shutter structure of FIG. 1 it is only necessary to provide the additional adjustable means or slide member 155, so that in this case also there is a considerable saving of structure and cost as compared to a camera where a separate diaphragm assembly is required. Moreover, it will be noted that since the edge 160 is in the form of an elongated edge of predetermined inclination and curvature, a stepless adjustment of the exposure aperture is provided, as compared to the aperture adjustment of FIG. 2 which will be adjustable only between predetermined increments as a result of the steps of the edge 48. Of course, it would be also possible to provide in the embodiment of FIG. 2 a stepless diaphragm adjustment and in the embodiment of FIG. 3 a stepwise diaphragm adjustment, if desired. Also, the shutter can be cocked automatically and it can be of the type which is released by riding of a member such as the member 39 or 139 off a pin or it can be cocked and then manually released, as shown in FIG. 2. Moreover, it is possible to change the configuration of the shutter blades from the configurations thereof shown in FIGS. 2 and 3 so as to provide a highly desirable configuration for the exposure aperture while at the same time providing an absolutely secure light-tightness when the shutter is closed. Moreover, the retarding mechanisms need not be of the type where the retarding is derived from a rotary mass, and it is possible to use instead an anchor and escapement wheel, as is well known in the art. Also, the shutters of FIGS. 2 and 3 may cooperate with suitable flash-contact apparatus to provide flash exposures, and in addition known self-timing mechanisms may be provided. In addition, it is possible to provide known arrangements according to which the operator will manually maintain the shutter in its open position for as long as the operator desires, this structure providing the B-setting of a conventional shutter according to which the shutter will close only when the operator releases the shutter.

It will be understood that each of the elements described above, or two or more together, may also find a useful application in other types of cameras differing from the types described above.

While the invention has been illustrated and described as embodied in camera shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera shutter, in combination, a pair of levers of equal length arranged parallel to each other; a pair of pivot means respectively supporting said levers for turning movement between their ends, said levers respectively having lever arms of equal lengths located on each side of a straight line drawn through the pair of turning axes formed by said pair of pivot means; a pair of links respectively extending parallel to and located on opposite sides of said straight line and respectively pivotally connected at their ends to the ends of said levers so that said levers and links form on opposite sides of said line a pair of parallelogram linkages constrained to move in opposite directions, respectively; and a pair of shutter blades symmetrically arranged with respect to the optical axis and operatively connected to said links to be moved thereby during turning of said levers.

2. In a camera shutter, in combination, a pair of linkage means each composed of a pair of parallel levers of equal length pivotally supported midway between their ends and a pair of elongated links extending between and pivotally connected to said levers at their ends so that each linkage means forms a pair of parallelogram linkages respectively located on opposite sides of a straight line drawn through the turning axes of the pair of levers, the pair of links of one linkage means being parallel to the pair of links of the other linkage means and the lever arms of one linkage means being shorter than the lever arms of the other linkage means; and a pair of shutter blades symmetrically arranged with respect to the optical axis and operatively connected to said links of said pair of linkage means to be moved between open and closed positions during movement of one linkage means relative to the other.

3. In a camera shutter, in combination, a pair of linkage means each composed of a pair of parallel levers of equal length pivotally supported midway between their ends and a pair of elongated links extending between and pivotally connected to said levers at their ends so that each linkage means forms a pair of parallelogram linkages respectively located on opposite sides of a straight line drawn through the turning axes of the pair of levers, the pair of links of one linkage means being parallel to the pair of links of the other linkage means and the lever arms of one linkage means being shorter than the lever arms of the other linkage means; a pair of shutter blades symmetrically arranged with respect to the optical axis and operatively connected to said links of said pair of linkage means to be moved between open and closed positions during movement of one linkage means relative to the other, said pair of linkage means having predetermined rest positions when the shutter is not cocked and is closed, and all of said levers being parallel to each other in said rest position of said pair of linkage means; means for moving both of said linkage means while retaining all of said levers parallel to each other during cocking of the shutter; and means for temporarily restraining one linkage means from returning to its rest position when the other linkage means is released for movement to its rest position whereby the blades will be moved to their open position opening the shutter until said one linkage means is released for return to its rest position.

4. In a camera shutter, in combination, a pair of linkage means each composed of a pair of parallel levers of equal length pivotally supported midway between their ends and a pair of elongated links extending between and pivotally connected to said levers at their ends so that each linkage means forms a pair of parallelogram linkages respectively located on opposite sides of a straight line drawn through the turning axes of the pair of levers, the pair of links of one linkage means being parallel to the pair of links of the other linkage means and the lever arms of one linkage means being shorter than the lever arms of the other linkage means; a pair of shutter blades symmetrically arranged with respect to the optical axis and operatively connected to said links of said pair of linkage means to be moved between open and closed positions during movement of one linkage means relative to the other, said pair of linkage means having predetermined rest positions when the shutter is not cocked and is closed, and all of said levers being parallel to each other in said rest position of said pair of linkage means; means for moving both of said linkage means while retaining all of said levers parallel to each other during cocking of the shutter; means for temporarily restraining one linkage means from returning to its rest position when the other linkage means is released for movement to its rest position whereby the blades will be moved to their open position opening the shutter until said one linkage means is released for return to its rest position; and a pair of spring means respectively cooperating with said pair of linkage means for urging them to said rest positions thereof.

5. In a camera shutter, in combination, a pair of linkage means each composed of a pair of parallel levers of equal length pivotally supported midway between their ends and a pair of elongated links etxending between and pivotally connected to said levers at their ends so that each linkage means forms a pair of parallelogram linkages respectively located on opposite sides of a straight line drawn through the turning axes of the pair of levers, the pair of links of one linkage means being parallel to the pair of links of the other linkage means and the lever arms of one linkage means being shorter than the lever arms of the other linkage means; a pair of shutter blades symmetrically arranged with respect to the optical axis and operatively connected to said links of said pair of linkage means to be moved between open and closed positions during movement of one linkage means relative to the other, said pair of linkage means having predetermined rest positions when the shutter is not cocked and is closed, and all of said levers being parallel to each other in said rest position of said pair of linkage means; means for moving both of said linkage means while retaining all of said levers parallel to each other during cocking of the shutter; means for temporarily restraining one linkage means from returning to its rest position when the other linkage means is released for movement to its rest position whereby the blades will be moved to their open position opening the shutter until said one linkage means is released for return to its rest position; and a pair of spring means respectively cooperating with said pair of linkage means for urging them to said rest positions thereof, each spring means including a spring extending between and connected to a lever and a link of the linkage means to which is it connected.

6. In a camera shutter, in combination, a pair of linkage means each composed of a pair of parallel levers of equal length pivotally supported midway between their ends and a pair of elongated links extending between and pivotally connected to said levers at their ends so that each linkage means forms a pair of parallelogram linkages respectively located on opposite sides of a straight line drawn through the turning axes of the pair of levers, the pair of links of one linkage means being parallel to the pair of links of the other linkage means and the lever arms of one linkage means being shorter than the lever arms of the other linkage means; a pair of shutter blades symmetrically arranged with respect to the optical axis and operatively connected to said links of said pair of linkage means to be moved between open and closed positions during movement of one linkage means relative to the other, said pair of linkage means having predetermined rest positions when the shutter is not cocked and is closed, and all of said levers being parallel to each other in said rest position of said pair of linkage means; means for moving both of said linkage means while retaining all of said levers parallel to each other during cocking of the shutter; means for temporarily restraining one linkage means from returning to its rest position when the other linkage means is released for movement to its rest position whereby the blades will be moved to their open position opening the shutter until said one linkage means is released for return to its rest position; and a pair of spring means respectively cooperating with said pair of linkage means for urging them to said rest positions thereof, each spring means including a spring extending between and connected to a lever and a link of the linkage means to which it is connected, said means for temporarily restraining said one linkage means against return movement to said rest position thereof acting on said one linkage means so that said other linkage means moves freely through its entire stroke back to said rest position in order to move the shutter blades to their open position before release of said one linkage means.

7. In a camera, in combination, first and second rotary shutter rings; a plurality of shutter blades operatively connected to said rings to be moved between open and closed positions during movement of said rings relative to each other, said rings being movable between rest and cocked positions; means cooperating with said rings for releasing first said first ring for return movement from said cocked toward said rest position thereof, said rings cooperating to move said blades from their closed toward their open position during movement of said first ring relative to said second ring from said cocked position of said first ring toward said rest position thereof, and for then releasing, after a predetermined exposure time, said second ring for movement toward said rest position thereof; a lever turnably carried by said first ring and having an edge portion of a predetermined curvature, said second ring having a stop portion in the path of movement of said lever with said first ring when the latter is released for movement toward said rest position thereof in advance of said second ring, and said edge portion of said lever engaging said stop portion of said second ring to limit the extent to which the blades move toward their open position, so as to provide with said blades a predetermined aperture whereby said blades also act as a diaphragm; and adjusting means cooperating with said lever for adjusting the latter relative to said first ring so as to provide a predetermined exposure aperture with said blades.

8. In a camera, in combination, first and second linkage means movable between rest and cocked positions; a plurality of shutter blades operatively connected to said first and second linkage means for movement between closed and open positions during movement of said first and second linkage means relative to each other; means cooperating with said first and second linkage means for releasing first said first linkage means for return from said cocked toward said rest position thereof and then, after a predetermined exposure time, said second linkage means for return from said cocked toward said rest position thereof, the movement of said first linkage means in advance of said second linkage means moving said shutter blades from their closed toward their open position and the movement of said second linkage means back to said rest position thereof subsequent to said first linkage means returning said blades to their closed position; an elongated slide member carried by said first linkage means for movement therealong and having a portion which engages a portion of said second linkage means during movement of said first linkage means from said cocked toward said rest position thereof in advance of said second linkage means, whereby said slide member limits the extent to which said first linkage means moves in advance of said second linkage means so as to limit the extent to which said blades are moved from their closed to their open position, and thus enable the blades to act also as a diaphragm; and adjusting means cooperating with said slide member for adjusting the position thereof relative to said first linkage means so as to adjust the extent to which said blades move from their closed to their open position and thus determine the size of the exposure aperture provided by said blades.

9. In a camera, in combination, a camera body; first and second frame means mounted on said camera body for movement along parallel paths; a plurality of shutter blades operatively connected to said first and second frame means to be moved thereby between open and closed positions; means cooperating with said first frame means for releasing the latter for movement in advance of said second frame means for moving said shutter blades connected to said first frame means relative to said shutter blades connected to said second frame means into an advanced position so that said shutter blades then form an exposure aperture the size of which depends on the extent of the advanced position of said blades connected to said first frame means; abutment means carried by one of said frame means; adjustable abutment means carried by the other of said frame means and adjustable between a plurality of positions in each of which said adjustable abutment means on said other frame means engages said abutment means on said one frame means in a different advanced position of said first frame means relative to said second frame means thus adjustably determining the extent of said advanced position; and means mounted on said camera body cooperating with said adjustable abutment means for adjustably determining the position thereof and thereby adjustably determining the extent of the advanced position of said second frame means relative to said first frame means.

10. In a camera, in combination, a camera body; first and second frame means mounted on said camera body rotatably about a common axis; a plurality of shutter blades operatively connected to said first and second frame means to be moved thereby between open and closed positions; means cooperating with said first frame means for releasing the latter for rotating movement in advance of said second frame means for moving said shutter blades connected to said first frame means relative to said shutter blades connected to said second frame means into an advanced position so that said shutter blades then form an exposure aperture the size of which depends on the extent of the advanced position of said blades connected to said first frame means; abutment means carried by one of said frame means; adjustable abutment means carried by the other of said frame means and adjustable between a plurality of positions in each of which said adjustable abutment means on said other frame means engages said abutment means on said one frame means in a different advanced position of said first frame means relative to said second frame means thus adjustably determining the extent of said advanced position; and means mounted on said camera body cooperating with said adjustable abutment means for adjustably determining the position thereof and thereby adjustably determining the extent of the advanced position of said second frame means relative to said first frame means.

11. In a camera according to claim 10, each of said first and second frame means consisting of a ring to which the shutter blades are operatively connected.

12. In a camera according to claim 9, said adjustable abutment means carried by the other of said frame means consisting of a double arm lever turnably mounted on said other frame means and including a plurality of abutment portions which selectively engage said abutment means on said one frame means depending upon the extent of turning of said adjustable abutment means.

References Cited by the Examiner
UNITED STATES PATENTS

| | | | |
|---|---|---|---|
| 885,142 | 4/08 | Brownell | 95—63 |
| 2,359,116 | 9/44 | Johnson | 95—63 |
| 2,525,099 | 10/50 | Kimble | 95—63 |
| 2,578,604 | 12/51 | Santoni | 95—63 |
| 2,670,667 | 3/54 | Aiken | 95—56 |
| 2,890,640 | 6/59 | Noack | 95—63 |
| 3,051,065 | 8/62 | Kobayashi | 95—10 |
| 3,089,400 | 5/63 | Kiper | 95—63 |

JOHN M. HORAN, *Primary Examiner.*

NORTON ANSHER, *Examiner.*